United States Patent
Dhekane et al.

(10) Patent No.: US 11,429,981 B2
(45) Date of Patent: Aug. 30, 2022

(54) MACHINE LEARNING SYSTEM FOR DETECTING FRAUD IN PRODUCT WARRANTY SERVICES

(71) Applicant: Dell Products L.P., Round Rock, TX (US)

(72) Inventors: Aditya P. Dhekane, Bangalore (IN); Omkar Tungare, Kalyan (IN); Cary P. Decuir, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 16/514,455

(22) Filed: Jul. 17, 2019

(65) Prior Publication Data
US 2021/0019761 A1 Jan. 21, 2021

(51) Int. Cl.
*G06Q 30/00* (2012.01)
*G06N 20/00* (2019.01)

(52) U.S. Cl.
CPC ........ *G06Q 30/0185* (2013.01); *G06N 20/00* (2019.01); *G06Q 30/012* (2013.01)

(58) Field of Classification Search
CPC .. G06Q 30/0185; G06Q 30/012; G06N 20/00; G06N 20/20; G06N 5/003
See application file for complete search history.

(56) References Cited

U.S. PATENT DOCUMENTS

| | | | |
|---|---|---|---|
| 2019/0213605 A1* | 7/2019 | Patel | G06N 5/048 |
| 2019/0311301 A1* | 10/2019 | Pyati | G06F 16/901 |
| 2020/0279180 A1* | 9/2020 | Yu | G06N 5/04 |
| 2021/0019657 A1* | 1/2021 | Wu | G06Q 30/0185 |

FOREIGN PATENT DOCUMENTS

WO WO-2018055589 A1 * 3/2018 ............. G06N 20/20

OTHER PUBLICATIONS

Collaris et al., "Instance-Level Explanations for Fraud Detection: A Case Study," published Jun. 19, 2018, available online at https://arxiv.org/pdf/1806.07129.pdf (Year: 2018).*

\* cited by examiner

*Primary Examiner* — Jan P Mincarelli
(74) *Attorney, Agent, or Firm* — Terrile, Cannatti & Chambers; Stephen A. Terrile (57) ABSTRACT

A method, system and computer-usable medium are disclosed for implementing a machine learning system for detecting fraud in product warranty services. In certain embodiments, a new dispatch request is subject to network analysis to determine the degree to which the new dispatch may be linked to known fraudulent dispatch requests. In certain embodiments, the new dispatch request may be subject to an outlier analysis to determine the degree of centrality of the new dispatch request with respect to outliers from historical dispatch requests. In certain embodiments, attributes and/or features, a degree to which the new dispatch request is linked to known fraudulent dispatches, and a degree of centrality of the new dispatch request are applied to an ensemble of machine learning models to determine the likelihood that the new dispatch request is fraudulent.

20 Claims, 8 Drawing Sheets

MACHINE LEARNING SYSTEM FOR DETECTING FRAUD IN PRODUCT WARRANTY SERVICES

BACKGROUND OF THE INVENTION

Field of the Invention

The present invention relates to information handling systems. More specifically, embodiments of the invention relate to a machine learning system for detecting fraud in product warranty services.

Description of the Related Art

Manufactures, retailers, OEMs, etc., provide various products and system configurations to their customers. Most transactions involving such products and systems involve one or more warranties. In certain contracts accompanying a product transaction, the warranty provides a written promise from a company to repair, replace, and/or service a product within a particular period of time. Although most warranty claims are valid, the warranty provider may have an exposure to the risk of fraudulent warranty dispatch requests.

SUMMARY OF THE INVENTION

A system of one or more computers can be configured to perform particular operations or actions by virtue of having software, firmware, hardware, or a combination of them installed on the system that in operation causes or cause the system to implement a machine learning system to detect fraudulent warranty dispatch requests. One general aspect includes a computer-implemented method for detecting fraud in product warranty requests, including: receiving a dispatch request, where the dispatch request includes one or more attributes, where the one or more attributes include attributes related to the requester of the dispatch request, and attributes related to an asset that is a subject of the dispatch request; executing a network analysis on the dispatch request to identify whether the one or more attributes can be linked to known fraudulent dispatch requests, where the network analysis provides an output corresponding to a degree to which the dispatch request may be linked to a known fraudulent dispatch request; executing an outlier analysis on the dispatch request to determine whether the one or more attributes can be linked to historical dispatch request outliers, where the outlier analysis provides an output indicative of a degree of centrality the dispatch request has with respect to the historical dispatch requests; applying a random forest model to the attributes of the dispatch request, the degree to which the dispatch request may be linked to a known fraudulent warranty request, and the output corresponding to the degree of centrality of the dispatch request to determine a first probability that the dispatch request is fraudulent; applying a boost model to the attributes of the dispatch request, the degree to which the dispatch request may be linked to a known fraudulent warranty request, and the output indicative of the degree of centrality of the dispatch request to determine a second probability that the dispatch request is fraudulent; and using the first and second probabilities pursuant to determining the likelihood that the dispatch request is fraudulent. Other embodiments of this aspect include corresponding computer systems, apparatus, and computer programs recorded on one or more computer storage devices, each configured to perform the actions of the methods.

Another general aspect includes a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: receiving a dispatch request, where the dispatch request includes one or more attributes, where the one or more attributes include attributes related to the requester of the dispatch request, and attributes related to an asset that is a subject of the dispatch request; executing a network analysis on the dispatch request to identify whether the one or more attributes can be linked to known fraudulent dispatch requests, where the network analysis provides an output corresponding to a degree to which the dispatch request may be linked to a known fraudulent dispatch request; executing an outlier analysis on the dispatch request to determine whether the one or more attributes can be linked to historical dispatch request outliers, where the outlier analysis provides an output indicative of a degree of centrality the dispatch request has with respect to the historical dispatch requests; applying a random forest model to the attributes of the dispatch request, the degree to which the dispatch request may be linked to a known fraudulent warranty request, and the output corresponding to the degree of centrality of the dispatch request to determine a first probability that the dispatch request is fraudulent; applying a boost model to the attributes of the dispatch request, the degree to which the dispatch request may be linked to a known fraudulent warranty request, and the output indicative of the degree of centrality of the dispatch request to determine a second probability that the dispatch request is fraudulent; and using the first and second probabilities pursuant to determining the likelihood that the dispatch request is fraudulent.

Another general aspect includes a non-transitory, computer-readable storage medium embodying computer program code, the computer program code including computer executable instructions configured for: receiving a dispatch request, where the dispatch request includes one or more attributes, where the one or more attributes include attributes related to the requester of the dispatch request, and attributes related to an asset that is a subject of the dispatch request; executing a network analysis on the dispatch request to identify whether the one or more attributes can be linked to known fraudulent dispatch requests, where the network analysis provides an output corresponding to a degree to which the dispatch request may be linked to a known fraudulent dispatch request; executing an outlier analysis on the dispatch request to determine whether the one or more attributes can be linked to historical dispatch request outliers, where the outlier analysis provides an output indicative of a degree of centrality the dispatch request has with respect to the historical dispatch requests; applying a random forest model to the attributes of the dispatch request, the degree to which the dispatch request may be linked to a known fraudulent warranty request, and the output corresponding to the degree of centrality of the dispatch request to determine a first probability that the dispatch request is fraudulent; applying a boost model to the attributes of the dispatch request, the degree to which the dispatch request may be linked to a known fraudulent warranty request, and the output indicative of the degree of centrality of the dispatch request to determine a second probability that the dispatch request is fraudulent; and using the first and second probabilities pursuant to determining the likelihood that the dispatch request is fraudulent.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for using machine learning to detect fraud in product warranty service dispatches. Certain aspects of the invention reflect an appreciation that fraudulent warranty dispatch requests may have limited visibility within the organization responsible for executing such warranty dispatches. As used herein, the term "organization" includes, without limitation, any entity that sells, leases, repairs, supports, etc., the use of a product, such as an information processing system, to a customer subject to warranty provisions. As used herein, the term "customer" includes, without limitation, an entity purchasing the product, an entity leasing the product, an end user of the product, etc. also, as used herein, the term "dispatch" includes, without limitation, demands by a customer that may include warranty services like part or product replacement, claims for missing parts or products, onsite engineer support etc. Although the present disclosure discusses the implementation of the machine learning system in the context of warranty services relating to an information processing system, it will be recognized, in view of the present disclosure, that the principles disclosed herein may be applicable to warranties relating to other types of products.

Certain aspects of the invention recognize that there are various manners in which dispatch request fraud may occur. As an example, counterfeit fraud may occur when there is an open market sale of a counterfeit part to a customer or the return of a part that has not originated from the organization, but has been altered by a defrauding party to appear genuine. Examples of such alterations may include labeling the counterfeit part with counterfeit serial number or service tags. One example of counterfeit fraud includes replacement of a 1 terabyte hard drive by the defrauding entity with internals from a 30-gigbyte hard drive to give the appearance of a 1 terabyte hard drive, and return of that altered drive to the organization for replacement or service.

Another form of dispatch fraud relates to exchange fraud. As an example, exchange fraud occurs a defrauding entity returns a part for exchange, where the part has been improperly altered in violation of the warranty or is otherwise out of warranty. An example, exchange fraud occurs when an out of warranty part is returned to receive a replacement for that part. As another example, exchange fraud occurs when a customer has altered the part (e.g., broken the seal of the case, attempted self-repair, etc.) in violation of the warranty terms but nevertheless attempts to return the altered part for a replacement part.

Another form of dispatch fraud relates to float fraud. In accordance with certain warranty terms, a replacement part may be dispatched to a customer before the customer returns the defective part to the supplier. A party may commit fraud by taking advantage of such warranty terms when the customer requests and receives the replacement part without the intention of returning the defective part.

Another form of dispatch fraud relates to retail fraud. As an example, a party may proffer a warranty claim for a product that has been purportedly sold through or by a recorded owning entity but which has never been purchased. An example of retail fraud occurs when a person enters a retailer, obtains the service tag information off a demonstration model, and makes a warranty claim based on the purchase of the product using a forged proof of purchase.

Another form of dispatch fraud, similar to retail fraud, relates to service tag fraud. As an example, service tag fraud occurs when a claim on a service tag that is legitimately owned by another person or entity is made by a defrauding entity.

Another form of dispatch fraud relates to defect fraud. As an example, defect fraud occurs when an entity makes a false claim of product failure or alleges a safety issue that is not the result of the natural failure of the product. Rather, the product failure or safety issue is a direct result of intentional damage to the product by the customer. Defect fraud often occurs in a noticeable manner close to the expiration of a warranty for the part.

Another form of dispatch fraud relates to shipping claim fraud. As an example, shipping claim fraud occurs when a customer falsely claims that it did not receive an item when it has, in fact, been received. Another example of ship claim fraud occurs when the item is shipped to an address that has been fraudulently changed so that the item is shipped to the fraudulent address.

Another form of dispatch fraud relates to point-of-sale fraud. As an example, point-of-sale fraud occurs when a fraudulent entity, pretending to be a known customer, creates an order in the name of that customer, lets the item be shipped to the official address of the customer. However, after the system is shipped, the defrauding entity changes the delivery address. In such instances, the defrauding entity receives the system for free because the organization loses visibility of the item once the delivery address has been changed.

Certain aspects of the present disclosure recognize that organizations often maintain electronic records relating to dispatch requests. In certain embodiments, attributes of the dispatch requests as found in the electronic records may include information that can be used to provide a system that uses machine learning to detect fraudulent dispatch requests for warranty services. Certain aspects of the present disclosure recognize that various fraud detection techniques may be trained using historical dispatch requests. In certain embodiments, multiple fraud detection techniques are combined with one another to provide an accurate assessment of whether a new dispatch request is fraudulent.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
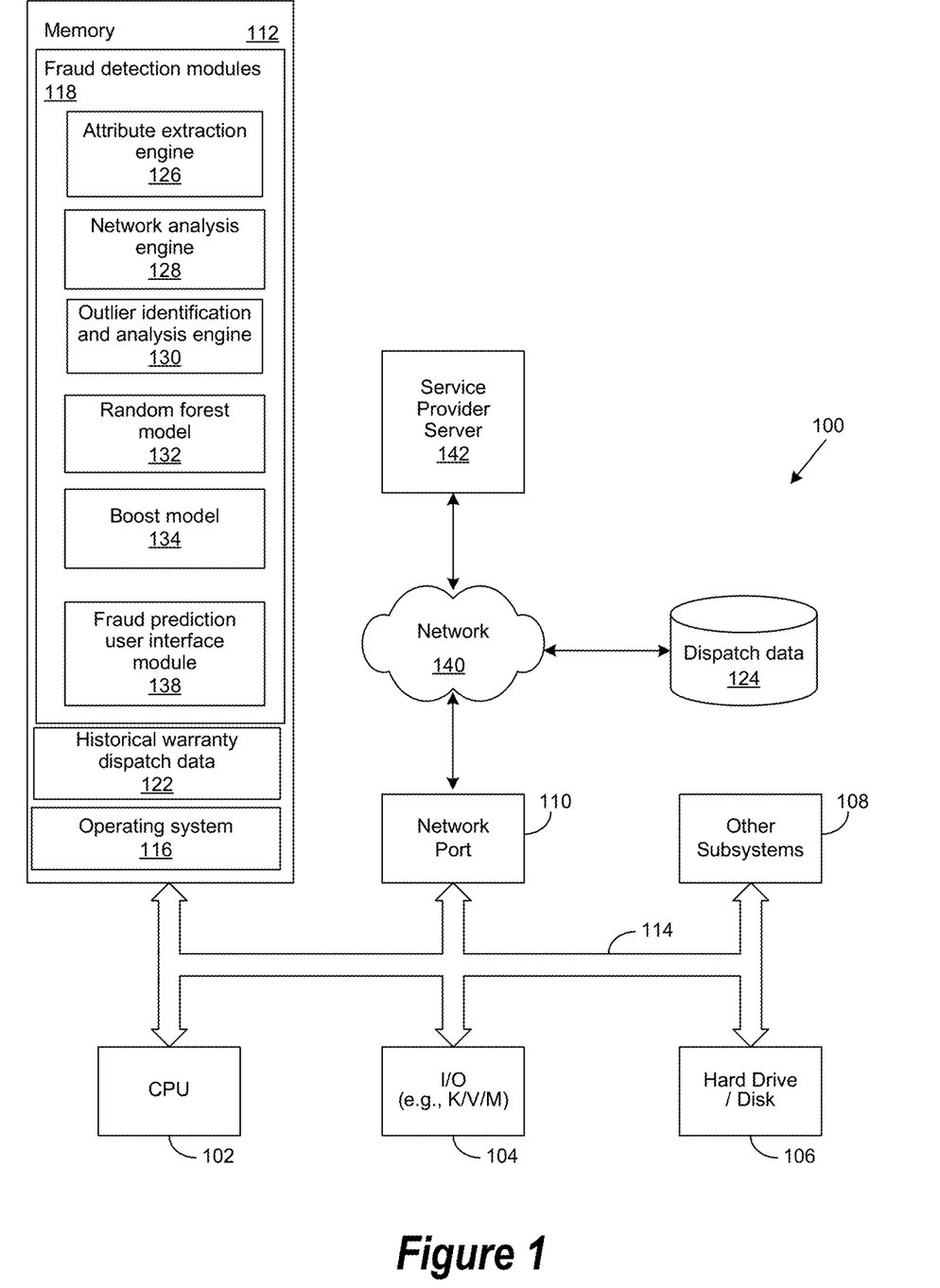
FIG. 1 shows a general illustration of components of an information handling system as implemented in the system and method of the present invention.

FIG. 1 is a generalized illustration of an information handling system that is configured as a fraud detection system 100 in accordance with certain embodiments of the system and method of the present disclosure. The fraud detection system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a fraud detection modules 118.

In certain embodiments, memory 112 may also include historical warranty dispatch data 122 including data relating to historical dispatches (both legitimate and fraudulent) that may be used to train various prediction models used to determine whether a subsequently received new dispatch request is likely to be fraudulent. In certain embodiments, the historical warranty dispatch data 122 may be stored in local volatile memory, retrieved from non-volatile storage, such as drive(s) 106, and/or accessed from one or more network storage devices 124. In one embodiment, the fraud detection system 100 may be downloaded from a service provider server 142. In another embodiment, one or more portions of the fraud detection system 118 may be provided as a service from the service provider server 142. It will be recognized, based on the teachings of the present disclosure, that the disclosed arrangement of storage and functional modules are merely exemplary and are not intended to limit the present invention to other combinations of storage and functional modules.

In certain embodiments, the fraud detection modules 118 include an attribute extraction engine 126. In certain embodiments, the attribute extraction engine 126 is configured to extract attributes from features in the historical warranty dispatch data 122. In certain embodiments, a feature is selected for attribute extraction based on whether the feature is useful in detecting fraudulent dispatches, as described herein. In certain embodiments, the attributes extracted from the historical warranty dispatch data 122 are provided to a network analysis engine 128. In certain embodiments, the network analysis engine 128 generates a linked network model that is used to determine the degree to which a dispatch request is linked to known fraudulent dispatch requests, as described herein. In certain embodiments, the attributes extracted from the historical warranty dispatch data 122 are provided to an outlier identification and analysis engine 130. In certain embodiments, the outlier identification and analysis engine 130 identifies dispatch requests having outliers as determined in a multivariate distribution analysis. In certain embodiments, the outlier analysis may be used to provide an output corresponding to the degree of centrality that a new dispatch request has with respect to the multivariate mean distribution of the corresponding attributes of the historical warranty dispatches.

In certain embodiments, the attributes extracted from the historical warranty dispatch data 122, the output of the network analysis engine 128, and the output of the outlier identification and analysis engine 130 are provided to train an ensemble of machine learning models. In certain embodiments, the ensemble of machine learning models includes a random forest model 132 and a boost model 134. In certain embodiments, the attributes of the historical dispatch requests, the relationships between the historical dispatch requests and known fraudulent dispatch requests as determined by the network analysis engine 128, and the relationship between historical dispatch requests and outliers identified by the outlier identification and analysis engine 130 may be applied to train the random forest model 132 and boost model 134.

Certain embodiments of the fraud detection system 100 may include a fraud prediction user interface module 138. In certain embodiments, the user interface module 138 provides a means for a user to interact with the fraud detection system 100 to receive and/or enter information at a user interface relating to a dispatch request. In certain embodiments, information relating to the likelihood that a new dispatch request is fraudulent may be presented at the user interface. In certain embodiments, the user interface may be used to enter information relating to a new dispatch request. It will be recognized, based on the teachings of the present disclosure, that the fraud prediction user interface module 138 may be used to allow a user to interact with the fraud detection system 100 in any number of different manners.

Figure 2:
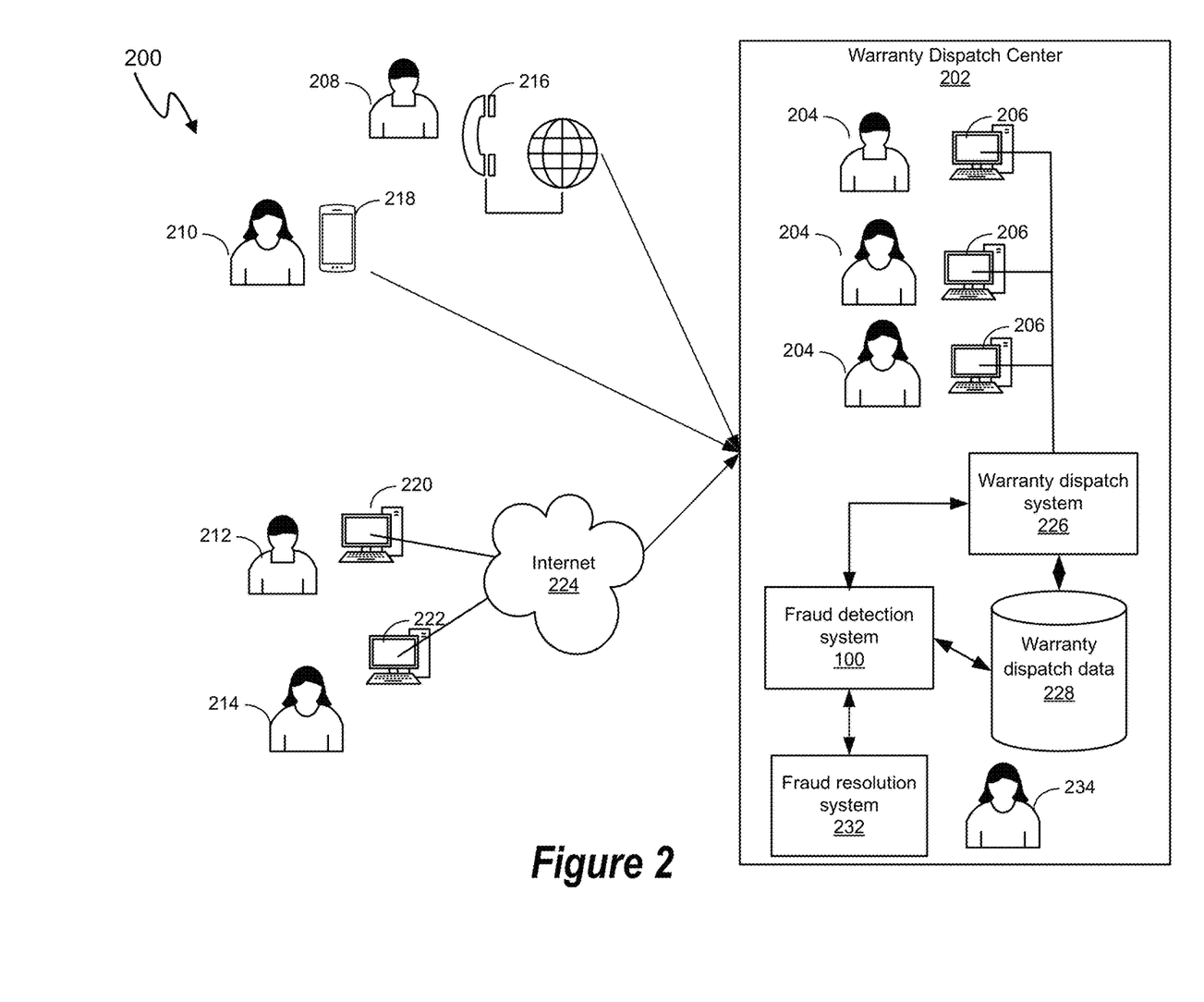
FIG. 2 is a block diagram of an electronic environment in which certain embodiments of the invention may be employed.

FIG. 2 is a block diagram of an electronic environment 200 in which certain embodiments of the fraud detection system 100 may be employed. In certain embodiments, the electronic environment 200 may include a customer service center 202 that is configured to receive warranty dispatch requests from a plurality of customers 208, 210, 212, and 214 using various means of communication. In certain embodiments, the customer service center 202 includes a plurality of service center operators 204 interacting with a plurality of information processing systems 206. In this example, customer 208 is in communication with the customer service center 202 using a telephone 216. Customer 210 is in communication with the customer service center 202 using a smart phone 218. Customers 212 and 214 are in communication with the customer service center 202 using, for example, respective computers 220 and 222 that are connected to a network, such as the Internet 224. In certain embodiments, customer 212 uses computer 220 to communicate via a chat center operated at the customer service center 202. In certain embodiments, customer 214 communicates with the customer service center 202 using email, a web form, etc. In certain embodiments, customers may communicate warranty dispatch request to the customer service center 202 and/or inquire as to the status of a dispatch request. Based on the teachings of the present disclosure, it will be recognized that various means of communication may be used by customers to submit service requests and inquire as to their status, the foregoing merely being non-limiting examples.

In certain embodiments, warranty dispatch requests are entered through information processing systems 206 operated by service center operators 204. In certain embodiments, operators 204 may access a warranty dispatch system 226 through information processing systems 206 to facilitate entry of warranty dispatch requests, update dispatch requests, and obtain information regarding the status of such dispatch requests. In certain embodiments, warranty dispatch requests and corresponding attribute data are stored in and retrieved from a datastore of warranty dispatch data 228. In certain embodiments, the warranty dispatch data 228 is accessible and editable by service center operators 204 through the warranty dispatch system 226. Additionally, or on the alternative, the customer service center 202 may include artificial intelligence processing systems that automatically generate warranty dispatch requests and/or update such requests in response to communications from the customers 208, 210, 212, and 214.

In certain embodiments, the warranty dispatch data 228 includes data that may be used by the fraud detection system 100 to predict the likelihood that a warranty dispatch request is fraudulent. In certain embodiments, the escalation prediction system 100 accesses the warranty dispatch data from the datastore of warranty dispatch data 228 and uses the data to determine whether a dispatch request is likely to be fraudulent, as described herein. In certain embodiments, information relating to whether a dispatch request is likely to be fraudulent is provided to a service center operator 204 through the warranty dispatch system 226 as the operator 204 is in communication with a customer. As an example, a warranty dispatch request may be flagged as a potential fraudulent request to an operator 204 as the operator is in communication with the customer thereby allowing the operator 204 to take immediate action to potentially mitigate damages that may otherwise have been caused by the fraudulent request. In certain embodiments, the fraud detection system 100 may provide information relating to the likelihood that one or more dispatch requests are fraudulent to a fraud resolution operator 234 using a fraud resolution system 232. In certain embodiments, the fraud resolution system 100 may provide the fraud resolution operator 234 with a human interface that allows the operator 234 to identify a plurality of warranty dispatch requests that have a high probability of being fraudulent. In certain embodiments, the operator 234 may use the information regarding the warranty dispatch requests to proactively engage the other portions of the organization to take steps to ensure that measures internal to the organization are taken to address a fraudulent dispatch request. As an example, the fraud resolution system 232 may provide information to the operator 234 that allows the operator 234 to identify specific actions that may be taken to expedite and/or resolve the fraudulent dispatch request. For example, the fraud resolution system 232 may provide information that allows the operator 234 to identify specific customers that may have committed fraud, ensure the proper parts are not shipped to fraudulent addresses address, notify authorities, etc.

In certain embodiments, the warranty dispatch data 228 includes records having attributes of the dispatch request. In certain embodiments, the attributes may include requester phone number, requester work phone number, requester email address, requester address, request date, shipping address, shipping postal code, requester postal code, requester company name, asset identifiers for the item that is the subject of the dispatch request, etc. In certain embodiments, the records may include an attribute added by an investigator that identifies the dispatch request as having been verifiably fraudulent. In certain embodiments, the attributes are extracted from the dispatch records and used to provide features that are relevant to whether a warranty dispatch request is likely to be fraudulent. In certain embodiments, the attributes may be used to derive features that are related to the dispatch requests, such as repeat dispatches under the same home phone number, repeat dispatches under the same work phone number, repeat dispatches from the same IP address, repeat dispatch requests from the same email address. In certain instances, the repetitive receipt of certain dispatch requests over a predetermined period of time may be indicate that the requests are fraudulent. In certain embodiments, the attributes may be used to derive features related to the dispatch requesters including, for example, discrepancies in requester information such as postal code, phone number, email mismatches, etc. In certain embodiments, the attributes may be used to derive features related to the asset (e.g., serial number, tag, proof of purchase, etc.) that is the subject of the dispatch request. As an example, if a given asset is associated with distinct counts of home phone numbers, work phone numbers, email addresses, IP addresses, postal code, requester name, and requester company, then there is a higher likelihood that a dispatch request related to the asset is fraudulent.

Certain embodiments employ an exemplary set of features that define potential risk indicators (PRI), including the following:

PRI 1: Mismatch of information in multiple dispatches under same service tag.

PRI 2: Mismatch of information registered in service request v. system ownership and system shipment information.

PRI 3: Same personal identity with dispatches being sent to different postal codes.

PRI 4: Information mismatch for personal identity cross check.

PRI 5: FRU (Field Replaceable Unit) part involved in the dispatch type is parts only.

PRI 6: Dispatches with missing Phone Number and Email.

PRI 7: Dispatches with known fraud indicators including one or more of:
  Flag #1: Repeat dispatches by Home phone #;
  Flag #2: Repeat dispatches by Work phone #;
  Flag #3: Repeat dispatches by email address;
  Flag #4: Repeat dispatches by email address; and
  Flag #5: Repeat dispatches by service tag.

PRI 8: Dispatches with known fraud indicators—
  Flag #1: Count of dispatch by Home phone #;
  Flag #2: Count of dispatch by Work phone #;
  Flag #3: Count of dispatch by email address;
  Flag #4: Count of dispatch by IP address;
  Flag #5: Count of dispatch by Customer name; and
  Flag #6: Count of dispatch by service tag.

It will be recognized, in view of the teachings of the present disclosure, that there are a wide range of features that may be relevant to an assessment of the likelihood that a dispatch request is fraudulent. Accordingly, the foregoing features are merely exemplary and not intended to limit the scope of the present invention.

Figure 3:
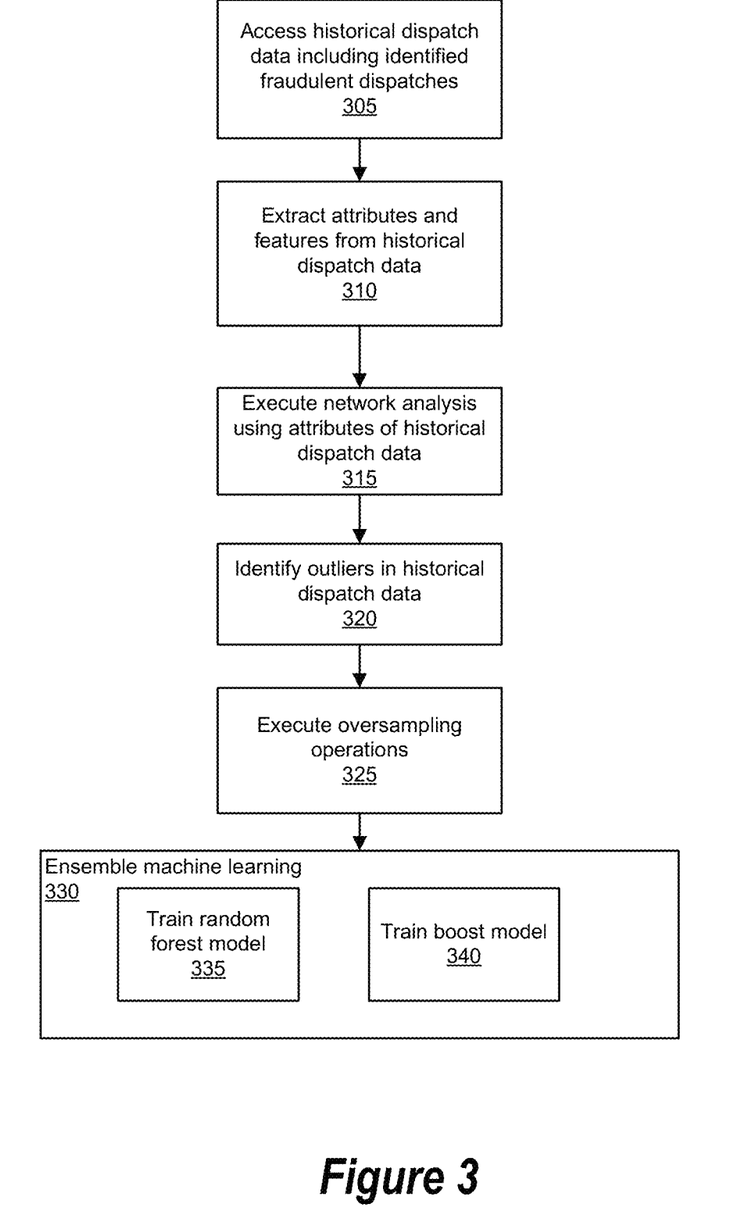
FIG. 3 is a flowchart depicting exemplary operations that may be executed by the fraud detection system during fraud detection training.

FIG. 3 is a flowchart depicting exemplary operations that may be executed by the fraud detection system 100 during fraud detection training. In this example, historical dispatch data, including dispatches that have been flagged as fraudulent, are accessed at operation 305. At operation, 310, attributes are extracted from the historical dispatch data. In some embodiments, the attributes are used at operation 310 to derive features that are relevant to a determination of whether a dispatch request is likely fraudulent.

In certain embodiments, a network analysis is applied to the attributes of the historical dispatch data at operation 315. Network analysis is a data-analysis technique used to assess relationships between nodes. In certain embodiments, network analysis identifies relationships among dispatch requests using dispatch addresses, home phone numbers, work phone numbers and email addresses.

The known fraud dispatch requests are collated and the requester attributes such as phone numbers, email and delivery address are extracted. In certain embodiments, links are generated using these attributes between known fraud dispatches and other dispatch requests. Certain embodiments use the dispatch requests as the nodes of the network and the several types of links as the edges between the nodes.

In certain embodiments, linked nodes have at least one edge connecting the nodes. In certain embodiments, dispatch requests and the historical data having all or some attributes that are as same as that of the known fraud dispatches get linked to the known fraud dispatches. In certain instances, a request linked to a known fraud dispatch denotes a higher vulnerability to possible fraudulent behavior which had been experienced in the past as well. In certain embodiments, requests with no common attribute with known fraud dispatches do not get linked into the network and, therefore, do not form a part of the linked network.

Certain embodiments use the generated linked network to generate one or more fields for each dispatch request. In certain embodiments, each dispatch request may be assigned a binary Yes/No field denoting whether the request is linked to a known fraudulent dispatch. In certain embodiments, each dispatch request may be assigned a numeric field which uses the concept of link strength. As an example, link strength may be assessed based on the number of links in terms of email, home phone number, work phone number, and address that a dispatch request has with a known fraudulent dispatch. In certain embodiments, as described herein, the fields capturing the properties of the dispatch request nodes within linked network may be used to train one or more supervised machine learning models.

Figure 4:
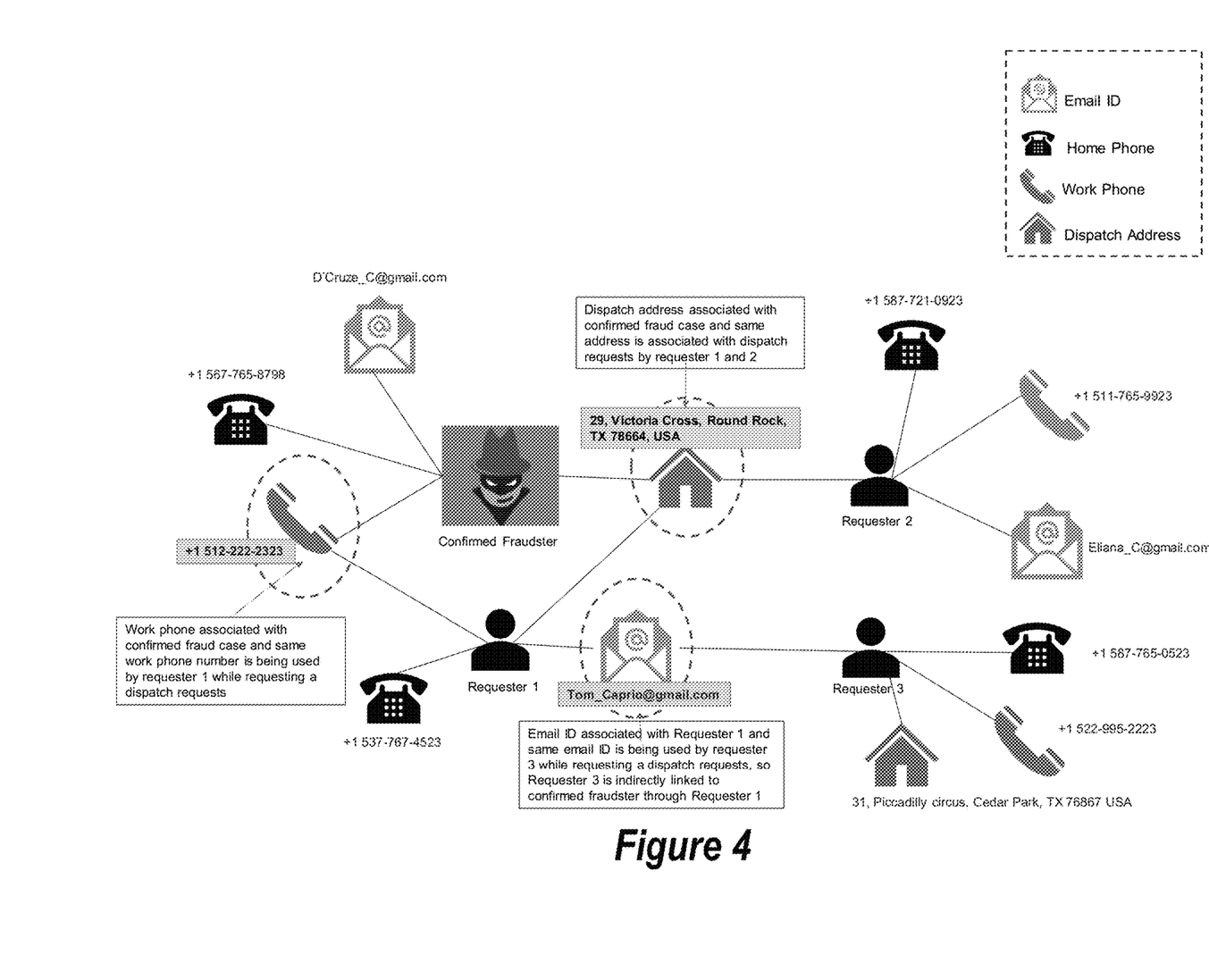
FIG. 4 is a pictorial diagram showing an example of links between dispatch nodes for a plurality of requesters and attributes of a confirmed fraudulent dispatch request.

FIG. 4 is a pictorial diagram showing an example of links between dispatch nodes for requesters (Requester 1, Requester 2, and Requester 3) and attributes of a confirmed fraudulent dispatch request. In this example, a confirmed fraudulent dispatch is linked to Requester 1 through a telephone number that matches the telephone number used by the confirmed fraudulent dispatch. Accordingly, Requester 1 has at least one link representing a direct relationship with a confirmed fraudulent dispatch. Also, Requester 1 has a further link to the confirmed fraudulent dispatch through an address that matches the address of the confirmed fraudulent dispatch. As such, there is a strong networked relationship between Requester 1 and the confirmed fraudulent dispatch. Dispatch requests from Requester 1 may therefore be treated as having a higher likelihood of being fraudulent in the fraud detection system.

In the example shown in FIG. 4, Requester 2 is directly linked to the confirmed fraudulent dispatch through and address that matches the address of the confirmed fraudulent dispatch. In certain embodiments, dispatch requests from Requester 2 may be treated as having a likelihood of being fraudulent in the fraud detection system. However, certain embodiments may treat dispatch requests from Requester 2 with less scrutiny than dispatch requests from Requester 1 since there are fewer links between the dispatch request from Requester 1 and the confirmed fraudulent dispatch then there are links between Requester 2 and the confirmed fraudulent dispatch.

As also shown in the example of FIG. 4, Requester 3 is indirectly linked to the confirmed fraudulent dispatch through Requester 1. More particularly, in this example, Requester 3 and Requester 1 are linked by virtue of use of the same email address thereby creating an indirect link between Requester 3 and the known fraudulent dispatch. In certain embodiments, dispatch requests from Requester 3 may be treated as having a likelihood of being fraudulent in the fraud detection system. However, certain embodiments may treat dispatch requests from Requester 3 with less scrutiny than dispatch requests from Requesters 1 and 2 since the link between the dispatch request from Requester 3 and the confirmed fraudulent dispatch is indirect.

It will be recognized, in view of the teachings of the present disclosure, that links between historical dispatches in the network may correspond to different degrees of relationships. In certain embodiments, direct links may be given more importance than indirect links. In certain embodiments, links between certain attribute types may be given more importance (e.g., links associated with addresses) than links associated with the same telephone number. Therefore, it is to be understood FIG. 4 merely describe non-limiting examples of relationships that may exist between historical dispatch requests that may exist in certain embodiments.

With reference again to FIG. 3, certain embodiments may identify outliers in the historical dispatch data at operation 320. In certain embodiments, although an outlier itself may not be associated with a fraudulent dispatch, linkages between such outliers and dispatch requests may be used to ascertain whether the new dispatch request is suspicious.

Figure 5:
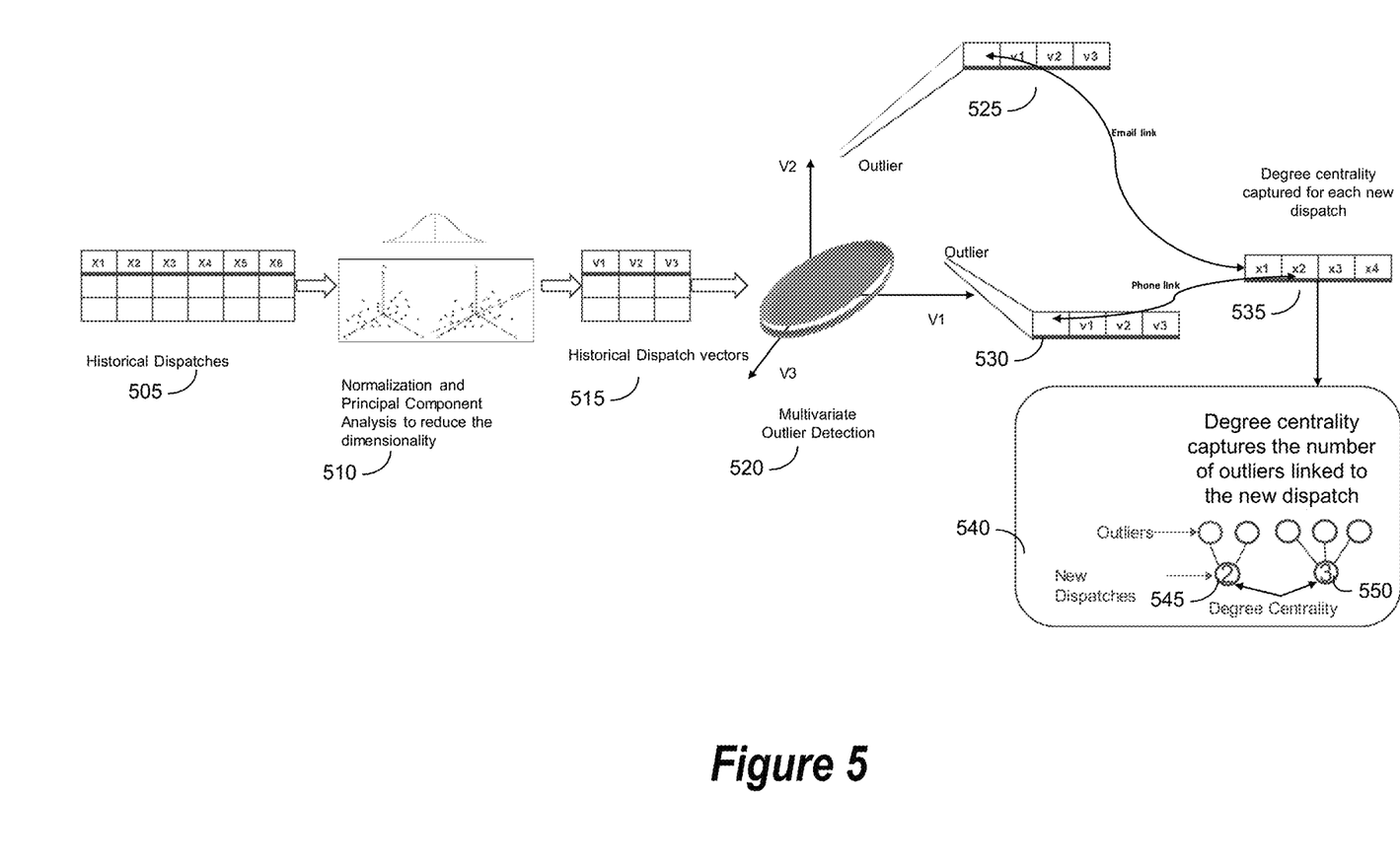
FIG. 5 illustrates operations that may be executed to identify outliers in the historical dispatch data in certain embodiments.

FIG. 5 illustrates operations that may be executed to identify outliers in the historical dispatch data in certain embodiments. In this example, vectors generated from the attributes of historical dispatches are accessed at operation 505. In certain embodiments, the vectors are normalized at operation 510 and, in certain embodiments, a principal component analysis is applied. In certain embodiments, the operations executed at 510 result in a set of historical dispatch vectors having reduced dimensionality. In certain embodiments, historical dispatch vectors with reduced dimensionality are subject to multivariate outlier detection at operation 520.

During multivariate outlier detection, certain embodiments determine a mean distribution of the dimensionally reduced vectors over the attribute space. In certain embodiments, a dispatch request is identified as an outlier if the dispatch request has a distance greater than a predetermined threshold from the mean distribution. In certain embodiments, the outliers are determined using a Mahalanobis distance analysis. As used herein, the Mahalanobis distance is a measure of how far a given observation is from the mean of the distribution. In certain embodiments, the outlier analysis may be used to determine the degree of centrality that a new dispatch request has with respect to the historical outliers. In certain embodiments, the degree of centrality for the outliers may be used to train one or more machine learning models, as described herein.

In certain embodiments, the historical dispatch data may be imbalanced in that fraudulent dispatches are underrepresented in the sample population. Accordingly, at operation 325 of FIG. 3, certain embodiments may execute an over-sampling operation on the historical dispatch data to alter this imbalance and effectively increase the representation of the fraudulent dispatches in the sample space. In certain embodiments, the imbalance may be altered using a Synthetic Minority Over-Sampling Technique (SMOTE) to effectively increase the population of fraudulent dispatches that are subsequently used to train the machine learning models. In certain embodiments, the use of SMOTEd data (e.g., historical dispatch data that has been subject to the SMOTE operation) in the machine learning model training process results in a more accurate model than would be generated using the original historical dispatch data sample population. In certain embodiments, the SMOTEd data may be divided into a training set and a validation/test set.

In certain embodiments, an ensemble of machine learning models are trained at operation 330 using the training set of the SMOTEd historical dispatch data. In certain embodiments, operation 330 includes training of a random forest model 335 and boost model 340.

As used herein, a random forest is a form of supervised machine learning in which an ensemble of random forest decision trees are trained using a "bagging" method that combines learning models to increase the accuracy of the overall result. Random Forest Models can be used with both classification and regression analysis. Certain embodiments of the disclosure may use classification analysis, regression analysis, or a combination of both analyses to in the random forest model.

Figure 6:
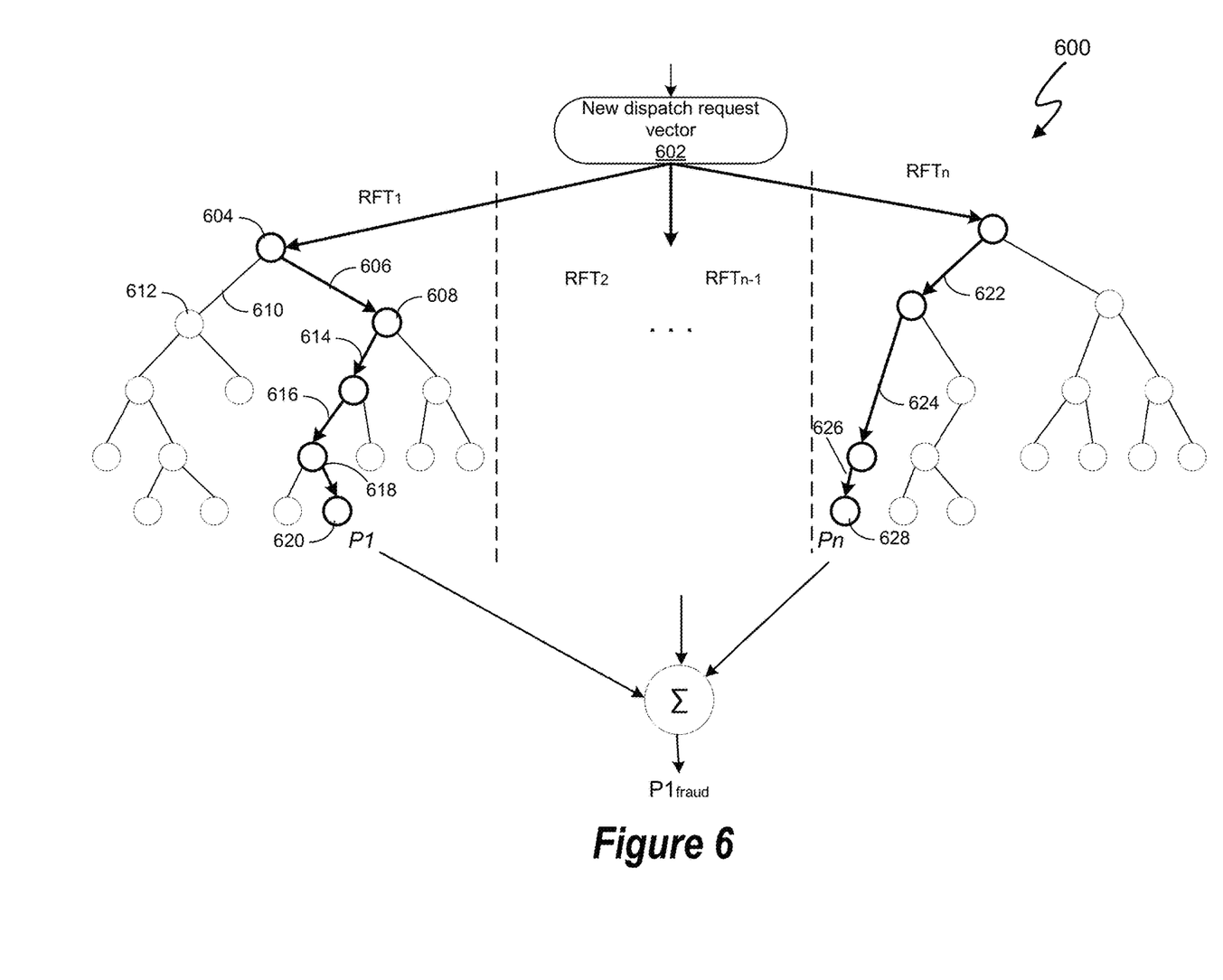
FIG. 6 depicts one example of a random forest model that has been trained on a training set of historical dispatch data and its application to a new dispatch request.

FIG. 6 depicts one example of a random forest model 600 that has been trained on the training set of the SMOTEd data. As shown, the random forest model 600 includes a plurality of random forest trees $RFT_1$ through $RFT_n$. Each random forest tree $RFT_1$ through $RFT_n$ includes a plurality of decision nodes (e.g., node 604) corresponding to attributes or features at which the random forest tree is split. Further, each random forest tree RFT1 through RFTn includes branches (e.g., branch 606) used to establish the criterion for transition to a subsequent node. As an example, node 604 may correspond to the feature PRI 1 (see above). In certain embodiments, $RFT_1$ may branch to node 608 if the conditions of branch 606 (e.g., the value of PRI 1 meets a first criterion, and branch to node 612 if the conditions of branch 610 (e.g. the value of PRI 1) are met.

In certain embodiments, a new dispatch request vector 602 is provided to the random forest model 600. In certain embodiments, one or more attributes or features of the dispatch request vector 602 are provided to the random forest trees $RFT_1$ through $RFT_n$. In the specific example shown in FIG. 6, the decisions with respect to vector 602 in $RTF_1$ are shown proceeding along branches 606, 614, 616, and 618 to arrive at decision node 620. In certain embodiments decision node 620 is associated with a probability and/or classification value $P_1$ that the dispatch request is fraudulent based on the criterion of random forest tree $RFT_1$.

In FIG. 6, the decisions of $RTF_n$ are shown proceeding along branches 622, 624, and 626 to arrive at decision node 628. In certain embodiments, decision node 628 is associated with a probability and/or classification $P_n$ that the dispatch request is fraudulent based on the criterion of random forest tree $RFT_n$. In certain embodiments, the outputs of the decision nodes (e.g. 620 through 628 of $RFT_1$ through $RFT_n$) are combined to generate a first probability or classification $P1_{fraud}$ corresponding to the likelihood that the dispatch request (e.g., the dispatch associated with dispatch request vector 602) is fraudulent.

In certain embodiments, multiple nodes within the same random forest tree may use the same attributes and/or features. Additionally, or on the alternative, in certain embodiments, multiple nodes within different random forest trees may use the same attributes and/or features. It will be recognized, based on the teachings of the present disclosure, that the combination of attributes and/or features used at the nodes of the random forest trees is dependent on the final version of the random forest model trained at operation 335 of FIG. 3.

As noted above, the ensemble machine learning operations 330 may also include training of a boost model 340. As used herein, boosting is a machine learning ensemble model for reducing bias and variance in supervised learning using machine learning algorithms that convert weak learners to strong ones. In certain embodiments, the boosting model is iteratively trained using weak classifiers with respect to a distribution and adding the classifiers to a generate a final strong classifier.

Figure 7:
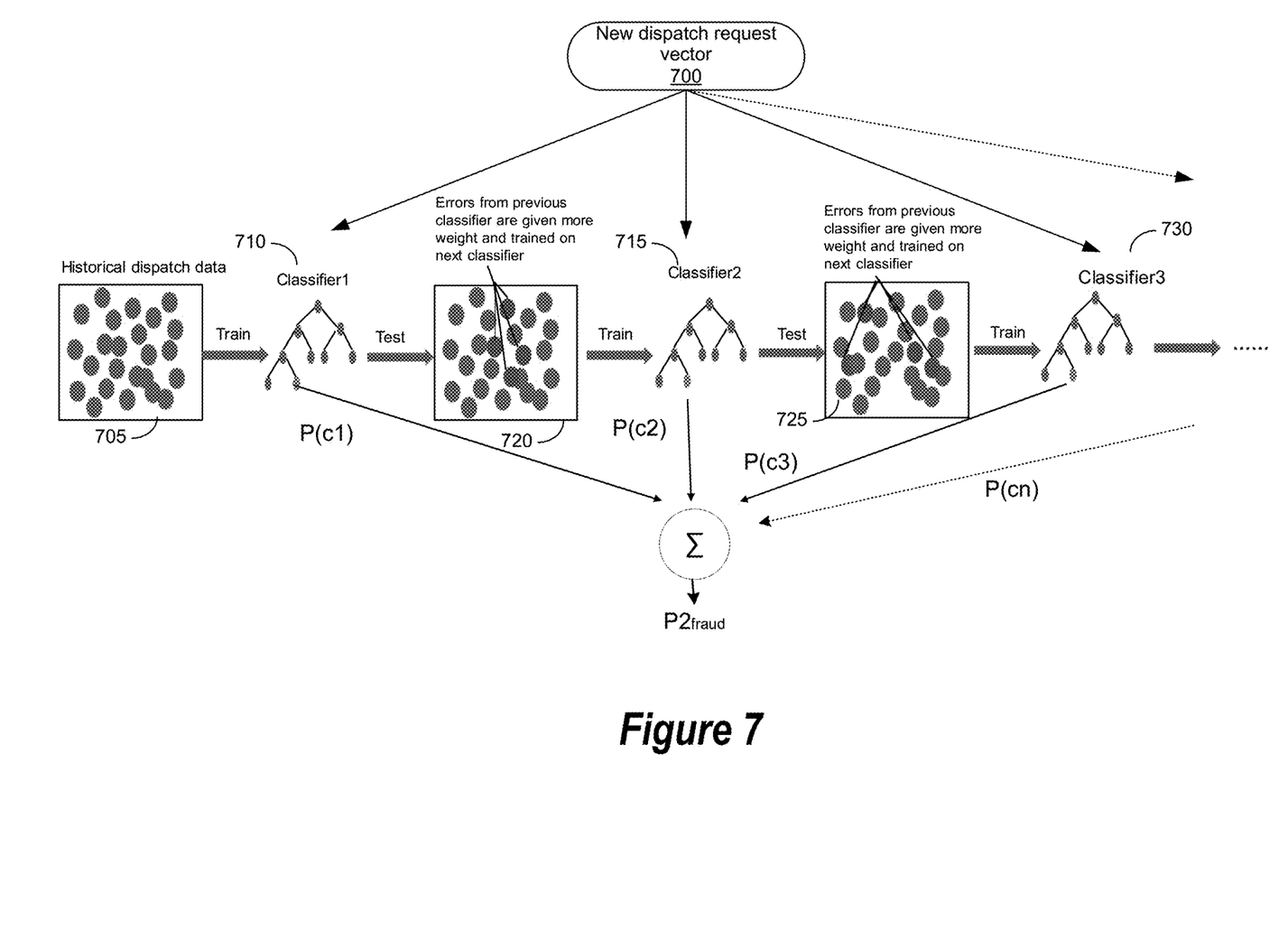
FIG. 7 illustrates one manner in which a boost model may be trained and its application to a new dispatch request.

FIG. 7 illustrates one manner in which a boost model may be trained and subsequently used to classify and/or determine the probability that a new dispatch request is likely to be fraudulent. In the specific example shown in FIG. 7, classifier 710 is trained using, for example, the training set of historical dispatch data 705. Once the classifier 710 is trained, the classifier 710 is tested using, for example, the test/validation set of historical dispatch data. In certain embodiments, a further classifier 715 is trained on the historical dispatch data 720 resulting from the validation testing of classifier 710. In certain embodiments, historical dispatches that were erroneously classified by classifier 710 are given a greater weight than other historical dispatches in historical dispatch data 720 during training of the classifier 715. In certain embodiments, classifier 715 is validated and generates a set of historical dispatch data 725 including historical dispatches that were improperly classified by the classifier 715. In certain embodiments, historical dispatches that were erroneously classified by classifier 715 are given a greater weight than other historical dispatches in historical dispatch data 725 during training of the classifier 730. In certain embodiments, classifier 715 is validated and generates a set of historical dispatch data 725 including historical dispatches that were improperly classified by the classifier 715. In certain embodiments, this iterative training of multiple classifiers using weighted historical dispatches continues until a desired number of classifiers have been trained.

In operation, certain embodiments of the boost model receive a new dispatch request vector 700 generated from a new dispatch request. In a manner similar to the random forest model, decisions are made at the nodes of each classifier to arrive at respective decision nodes. As an example, application of the dispatch request vector row 700 to the output of classifier 710 results in a probability and/or classification P(c1) that the dispatch request used to generate from dispatch request vector 700 is likely to be fraudulent. Similarly, application of the dispatch request vector 700 to the classifier 715 results in a probability and/or classification P(c2) that the dispatch request used to generate dispatch request vector 700 is likely to be fraudulent. Application of the dispatch request vector 700 to the output of classifier 730 results in a probability and/or classification P(c3) that the dispatch request used to generate dispatch request vector 700 is likely to be fraudulent. The remaining classifiers of the boost model likewise make respective probabilities and/or classifications that the dispatch request generated from dispatch request vector 700 is likely to be fraudulent. In certain embodiments, the results P(c1) through P(cn) are combined (e.g., averaged, weighted averaged, etc.) to generate an output $P2_{fraud}$ corresponding to the likelihood that the dispatch request generated from the dispatch request vector 700 is fraudulent. In certain embodiments, the new dispatch request vector 700 may be formatted and/or include the same information as dispatch request vector 602 of FIG. 6.

Figure 8:
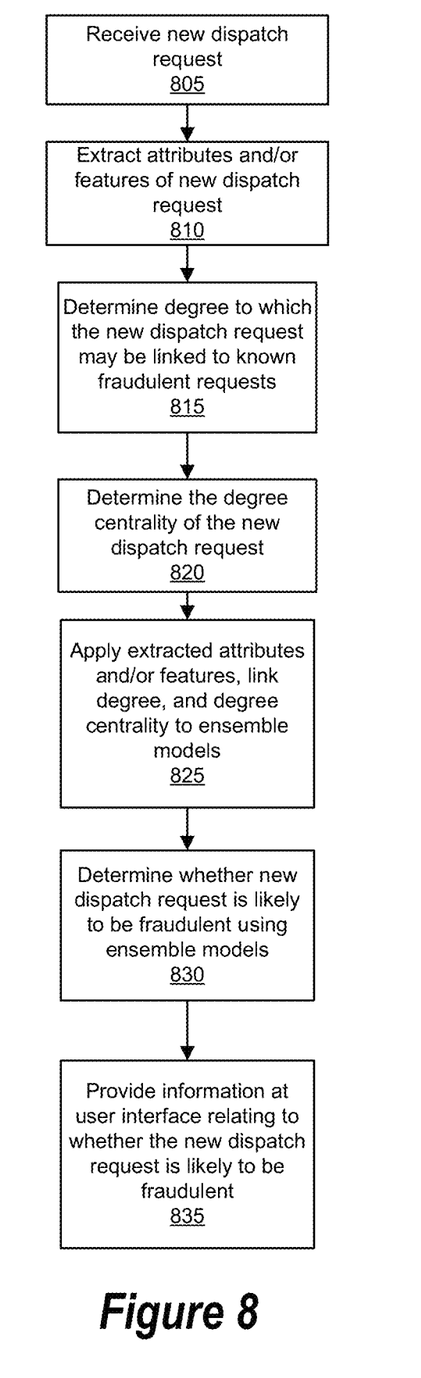
FIG. 8 depicts a flowchart showing operations that may be applied to a new dispatch request by the fraud detection system.

FIG. 8 depicts a flowchart showing operations that may be applied to a new dispatch request by the fraud detection system. In certain embodiments, the new dispatch request is received at operation 805. In certain embodiments, attributes and/or features of the new dispatch request are extracted at operation 810. At operation 815, certain embodiments determine the degree to which the new dispatch request may be linked to known fraudulent requests. In certain embodiments, operation 815 employs the linked network generated at operation 315 of FIG. 3 and searches for edges that may exist between the new dispatch request and nodes of the linked network. In certain embodiments, operation 815 is used to generate the binary link value and link strength value that are subsequently provided to the trained machine learning models.

In certain embodiments, the degree of centrality of the new dispatch request is determined at operation 820. In certain embodiments, the degree of centrality is based on the relationship between outliers identified at operation 320 of FIG. 3 and a vector generated from the attributes and/or features of the new dispatch request.

One manner of determining the degree of centrality in certain embodiments is shown at operation 540 of FIG. 5. In this example, the degree of centrality captures the number of outliers linked to the new dispatch. In the example shown in FIG. 5, new dispatch 545 has vector components common to two outliers and, therefore, is linked by two corresponding edges. In certain embodiments, the degree of centrality assigned to new dispatch 545 is 2 based on the number of outliers to which the new dispatch 545 is linked. Also, in the example depicted in FIG. 5, new dispatch 550 has vector components common to three outliers and, therefore, is linked by three corresponding edges. In certain embodiments, the degree of centrality assigned to new dispatch 550 is 3 based on the number of outliers to which new dispatch 550 is linked.

In certain embodiments, the extracted attributes and/or features, linked degree information generated at operation 815, and degree of centrality determined at operation 820 are applied to the input of the ensemble models. In certain embodiments, the information is applied as one or more vectors. In certain embodiments, the vectors are applied to the trained random forest tree model and trained boost model. In certain embodiments, the trained random forest tree model and trained boost model generate respective classification probabilities $P1_{fraud}$ and $P2_{fraud}$, which are then used to make a final determination as to the likelihood that the new dispatch request is fraudulent at operation 830. In certain embodiments, this determination is made by comparing the value of $P1_{fraud}$ and $P2_{fraud}$ against one or more predetermined threshold values. In certain embodiments, only the value $P1_{fraud}$ or $P2_{fraud}$ corresponding to the highest probability of fraud is used as the baseline for the determination as to whether the new dispatch request is fraudulent. As an example, if the value of $P1_{fraud}$ corresponds to a higher probability of fraud than $P2_{fraud}$, then $P1_{fraud}$ may be used as a baseline for a determination of the likelihood that a dispatch request is fraudulent. As another example, if the value of $P2_{fraud}$ corresponds to a higher probability of fraud than $P1_{fraud}$, then $P2_{fraud}$ may be used as a baseline for a determination of the likelihood that a dispatch request is fraudulent. As a further example, a determination as to likelihood that a dispatch request is fraudulent may be based on an average of $P1_{fraud}$ and $P2_{fraud}$, weighted average of $P1_{fraud}$ and $P2_{fraud}$, or some other mathematical relationship between these values.

In certain embodiments, once the determination at operation 835 has been completed, the information relating to the determination may be stored, for example, in a datastore (e.g., warranty dispatch datastore 228 of FIG. 2). Such information may include, for example, identification of the dispatch request, the address(es) associated with the dispatch request, phone number(s) associated with the dispatch request, requester names associated with the dispatch request, a quantitative value for the likelihood that the dispatch request is fraudulent, a qualitative value for the likelihood that the dispatch request is fraudulent, etc. As described herein, this information may be provided to operators 204 using, for example, warranty dispatch system 226. Additionally, or on the alternative, this information may be provided to fraud resolution operator 234.

As will be appreciated by one skilled in the art, the present invention may be embodied as a method, system, or computer program product. Accordingly, embodiments of the invention may be implemented in hardware, in software (including firmware, resident software, micro-code, etc.) or in an embodiment combining software and hardware. Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language, R, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for detecting fraud in product warranty requests within a warranty dispatch center, the warranty dispatch center comprising a plurality of service center information processing systems, a fraud detection system and a datastore of warranty dispatch data, comprising:
    receiving a dispatch request to the warranty dispatch center, wherein the dispatch request includes one or more attributes, wherein the one or more attributes include attributes related to the requester of the dispatch request, and attributes related to an asset that is a subject of the dispatch request;
    executing a network analysis via the fraud detection system on the dispatch request to identify whether the one or more attributes can be linked to known fraudulent dispatch requests, wherein the network analysis provides an output corresponding to a degree to which the dispatch request may be linked to a known fraudulent dispatch request, the network analysis accessing the datastore of warranty dispatch data when executing;
    executing an outlier analysis via the fraud detection system on the dispatch request to determine whether the one or more attributes can be linked to historical dispatch request outliers, wherein the outlier analysis provides an output indicative of a degree of centrality the dispatch request has with respect to the historical dispatch requests, the degree of centrality being based upon a number of outliers to which the dispatch request is linked;
    applying a random forest model via the fraud detection system to the attributes of the dispatch request, the degree to which the dispatch request may be linked to a known fraudulent warranty request, and the output corresponding to the degree of centrality of the dispatch request to determine a first probability that the dispatch request is fraudulent, the random forest model being trained using historical dispatch requests;
    applying a boost model via the fraud detection system to the attributes of the dispatch request, the degree to which the dispatch request may be linked to a known fraudulent warranty request, and the output indicative of the degree of centrality of the dispatch request to determine a second probability that the dispatch request is fraudulent, the boost model being trained using historical dispatch requests; and
    using the first and second probabilities pursuant to determining the likelihood that the dispatch request is fraudulent.

2. The computer-implemented method of claim 1, further comprising:
    providing information at a user interface relating to whether a dispatch request is likely to be fraudulent, wherein the information provided at the user interface is based, at least in part, on the first and second probabilities.

3. The computer-implemented method of claim 1, wherein:
    the network analysis utilizes attributes including one or more of a phone number associated with the dispatch request, an email associated with the dispatch request, and a delivery address associated with the dispatch request.

4. The computer-implemented method of claim 1, wherein:
    the determination as to whether the dispatch request is likely to be fraudulent is based, at least in part, on the greater of the first and second probabilities.

5. The computer-implemented method of claim 1, further comprising:
    receiving attributes of the historical dispatch requests;
    determining a mean distribution of attributes of the historical dispatch requests; and
    identifying whether a historical dispatch request is an outlier by comparing attributes of the historical dispatch request with the mean distribution of the attributes of the historical dispatch requests, wherein a historical dispatch request is identified as an outlier if the historical dispatch request has a distance greater than a predetermined threshold from the mean distribution of the attributes of the historical dispatch requests.

6. The computer-implemented method of claim 1, further comprising:
receiving a set of historical dispatch requests, wherein the set of historical dispatch requests includes one or more attributes, wherein the one or more attributes include attributes related to the requester of the warranty dispatch request and attributes related to the asset that is a subject of the warranty dispatch request, wherein the set of historical warranty dispatch requests includes historical warranty dispatch requests that are identified as fraudulent warranty dispatch requests; and
executing a synthetic minority over-sampling technique on the set of historical warranty dispatch requests to generate a subset of historical warranty dispatch requests having a higher proportion of fraudulent warranty dispatch requests than non-fraudulent warranty dispatch requests as compared to the set of historical warranty dispatch requests.

7. The computer-implemented method of claim 6, further comprising:
training an ensemble of machine learning models, the ensemble of machine learning models comprising the random forest model and the boost model using the subset of historical dispatch requests, the training resulting in a more accurate model than would be generating using the original historical dispatch data sample population.

8. A system comprising:
a processor;
a data bus coupled to the processor; and
a non-transitory, computer-readable storage medium embodying computer program code for detecting fraud in product warranty requests within a warranty dispatch center, the warranty dispatch center comprising a plurality of service center information processing systems, a fraud detection system and a datastore of warranty dispatch data, the non-transitory, computer-readable storage medium being coupled to the data bus, the computer program code interacting with a plurality of computer operations and comprising instructions executable by the processor and configured for:
receiving a dispatch request to the warranty dispatch center, wherein the dispatch request includes one or more attributes, wherein the one or more attributes include attributes related to the requester of the dispatch request, and attributes related to an asset that is a subject of the dispatch request;
executing a network analysis on the dispatch request to identify whether the one or more attributes can be linked to known fraudulent dispatch requests, wherein the network analysis provides an output corresponding to a degree to which the dispatch request may be linked to a known fraudulent dispatch request, the network analysis accessing the datastore of warranty dispatch data when executing;
executing an outlier analysis on the dispatch request to determine whether the one or more attributes can be linked to historical dispatch request outliers, wherein the outlier analysis provides an output indicative of a degree of centrality the dispatch request has with respect to the historical dispatch requests, the degree of centrality being based upon a number of outliers to which the dispatch request is linked;
applying a random forest model via the fraud detection system to the attributes of the dispatch request, the degree to which the dispatch request may be linked to a known fraudulent warranty request, and the output corresponding to the degree of centrality of the dispatch request to determine a first probability that the dispatch request is fraudulent, the random forest model being trained using historical dispatch requests;
applying a boost model via the fraud detection system to the attributes of the dispatch request, the degree to which the dispatch request may be linked to a known fraudulent warranty request, and the output indicative of the degree of centrality of the dispatch request to determine a second probability that the dispatch request is fraudulent, the boost model being trained using historical dispatch requests; and
using the first and second probabilities pursuant to determining the likelihood that the dispatch request is fraudulent.

9. The system of claim 8, wherein the instructions are further configured for:
providing information at a user interface relating to whether a dispatch request is likely to be fraudulent, wherein the information provided at the user interface is based, at least in part, on the first and second probabilities.

10. The system of claim 8, wherein:
the network analysis utilizes attributes including one or more of a phone number associated with the dispatch request, an email associated with the dispatch request, and a delivery address associated with the dispatch request.

11. The system of claim 8, wherein:
the determination as to whether the dispatch request is likely to be fraudulent is based, at least in part, on the greater of the first and second probabilities.

12. The system of claim 8, wherein the instructions are further configured for:
receiving attributes of the historical dispatch requests;
determining a mean distribution of attributes of the historical dispatch requests; and
identifying whether a historical dispatch request is an outlier by comparing attributes of the historical dispatch request with the mean distribution of the attributes of the historical dispatch requests, wherein a historical dispatch request is identified as an outlier if the historical dispatch request has a distance greater than a predetermined threshold from the mean distribution of the attributes of the historical dispatch requests.

13. The system of claim 8, wherein the instructions are further configured for:
receiving a set of historical dispatch requests, wherein the set of historical dispatch requests includes one or more attributes, wherein the one or more attributes include attributes related to the requester of the warranty dispatch request and attributes related to the asset that is a subject of the warranty dispatch request, wherein the set of historical warranty dispatch requests includes historical warranty dispatch requests that are identified as fraudulent warranty dispatch requests; and
executing a synthetic minority over-sampling technique on the set of historical warranty dispatch requests to generate a subset of historical warranty dispatch requests having a higher proportion of fraudulent warranty dispatch requests than non-fraudulent warranty dispatch requests as compared to the set of historical warranty dispatch requests.

14. The system of claim 13, wherein the instructions are further configured for:

training an ensemble of machine learning models, the ensemble of machine learning models comprising the random forest model and the boost model using the subset of historical dispatch requests, the training resulting in a more accurate model than would be generating using the original historical dispatch data sample population.

15. A non-transitory, computer-readable storage medium embodying computer program code for detecting fraud in product warranty requests within a warranty dispatch center, the warranty dispatch center comprising a plurality of service center information processing systems, a fraud detection system and a datastore of warranty dispatch data, the computer program code comprising computer executable instructions configured for:

receiving a dispatch request to the warranty dispatch center, wherein the dispatch request includes one or more attributes, wherein the one or more attributes include attributes related to the requester of the dispatch request, and attributes related to an asset that is a subject of the dispatch request;

executing a network analysis on the dispatch request to identify whether the one or more attributes can be linked to known fraudulent dispatch requests, wherein the network analysis provides an output corresponding to a degree to which the dispatch request may be linked to a known fraudulent dispatch request, the network analysis accessing the datastore of warranty dispatch data when executing;

executing an outlier analysis on the dispatch request to determine whether the one or more attributes can be linked to historical dispatch request outliers, wherein the outlier analysis provides an output indicative of a degree of centrality the dispatch request has with respect to the historical dispatch requests, the degree of centrality being based upon a number of outliers to which the dispatch request is linked;

applying a random forest model via the fraud detection system to the attributes of the dispatch request, the degree to which the dispatch request may be linked to a known fraudulent warranty request, and the output corresponding to the degree of centrality of the dispatch request to determine a first probability that the dispatch request is fraudulent, the degree of centrality being based upon a number of outliers to which the dispatch request is linked;

applying a boost model via the fraud detection system to the attributes of the dispatch request, the degree to which the dispatch request may be linked to a known fraudulent warranty request, and the output indicative of the degree of centrality of the dispatch request to determine a second probability that the dispatch request is fraudulent, the random forest model being trained using historical dispatch requests; and using the first and second probabilities pursuant to determining the likelihood that the dispatch request is fraudulent.

16. The non-transitory, computer-readable storage medium of claim 15, wherein the instructions are further configured for:

providing information at a user interface relating to whether a dispatch request is likely to be fraudulent, wherein the information provided at the user interface is based, at least in part, from the first and second probabilities.

17. The non-transitory, computer-readable storage medium of claim 15, wherein:

the network analysis utilizes attributes including one or more of a phone number associated with the dispatch request, an email associated with the dispatch request, and a delivery address associated with the dispatch request.

18. The non-transitory, computer-readable storage medium of claim 15, wherein:

the determination as to whether the dispatch request is likely to be fraudulent is based on the greater of the first and second probabilities.

19. The non-transitory, computer-readable storage medium of claim 15, wherein the instructions are further configured for:

receiving attributes of the historical dispatch requests;

determining a mean distribution of attributes of the historical dispatch requests; and identifying whether a historical dispatch request is an outlier by comparing attributes of the historical dispatch request with the mean distribution of the attributes of the historical dispatch requests, wherein a historical dispatch request is identified as an outlier if the historical dispatch request has a distance greater than a predetermined threshold from the mean distribution of the attributes of the historical dispatch requests.

20. The non-transitory, computer-readable storage medium of claim 15, wherein the instructions are further configured for:

receiving a set of historical dispatch requests, wherein the set of historical dispatch requests includes one or more attributes, wherein the one or more attributes include attributes related to the requester of the warranty dispatch request and attributes related to the asset that is a subject of the warranty dispatch request, wherein the set of historical warranty dispatch requests includes historical warranty dispatch requests that are identified as fraudulent warranty dispatch requests; and executing a synthetic minority over-sampling technique on the set of historical warranty dispatch requests to generate a subset of historical warranty dispatch requests having a higher proportion of fraudulent warranty dispatch requests than non-fraudulent warranty dispatch requests as compared to the set of historical warranty dispatch requests.

* * * * *